March 29, 1960

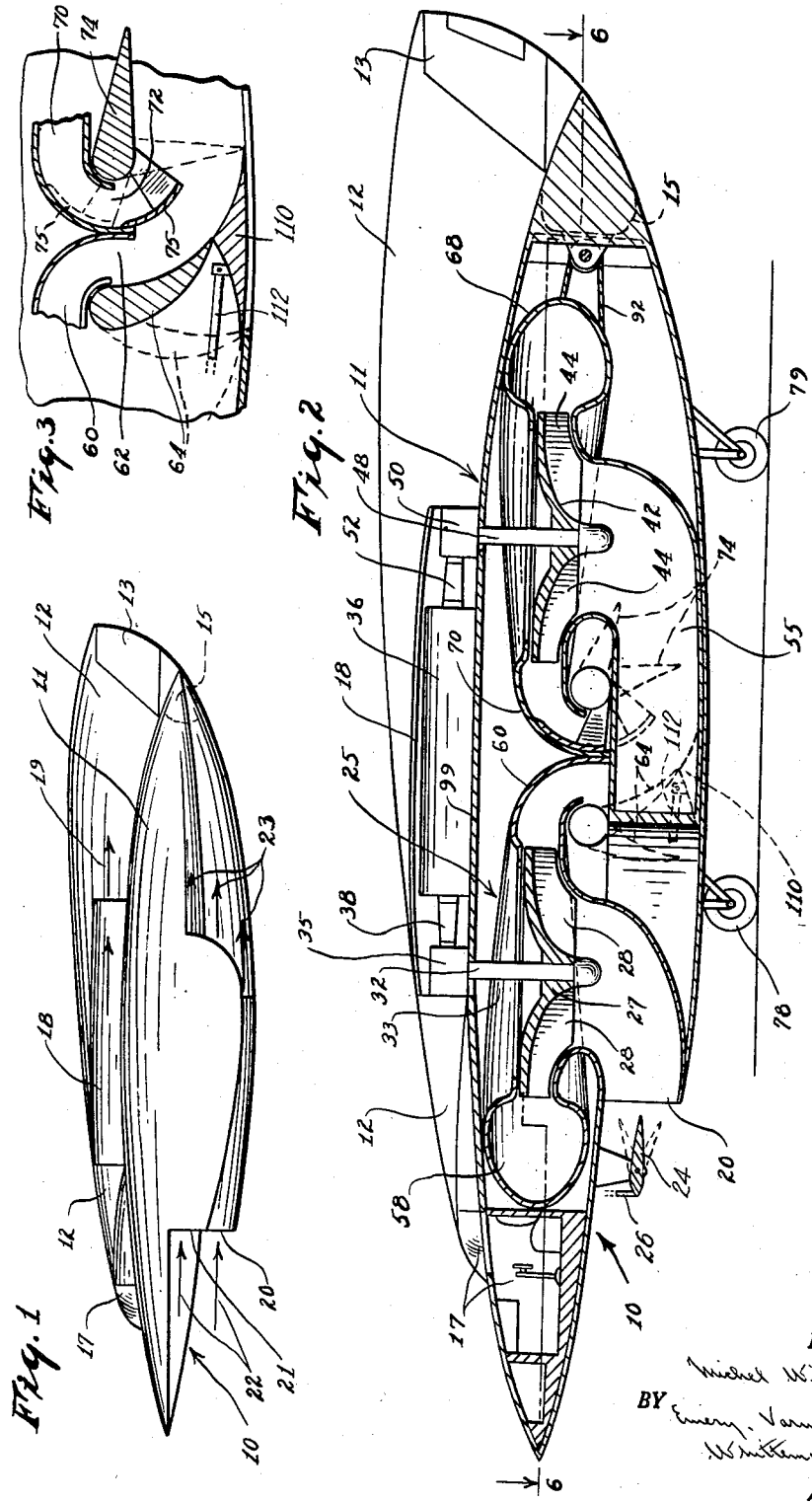

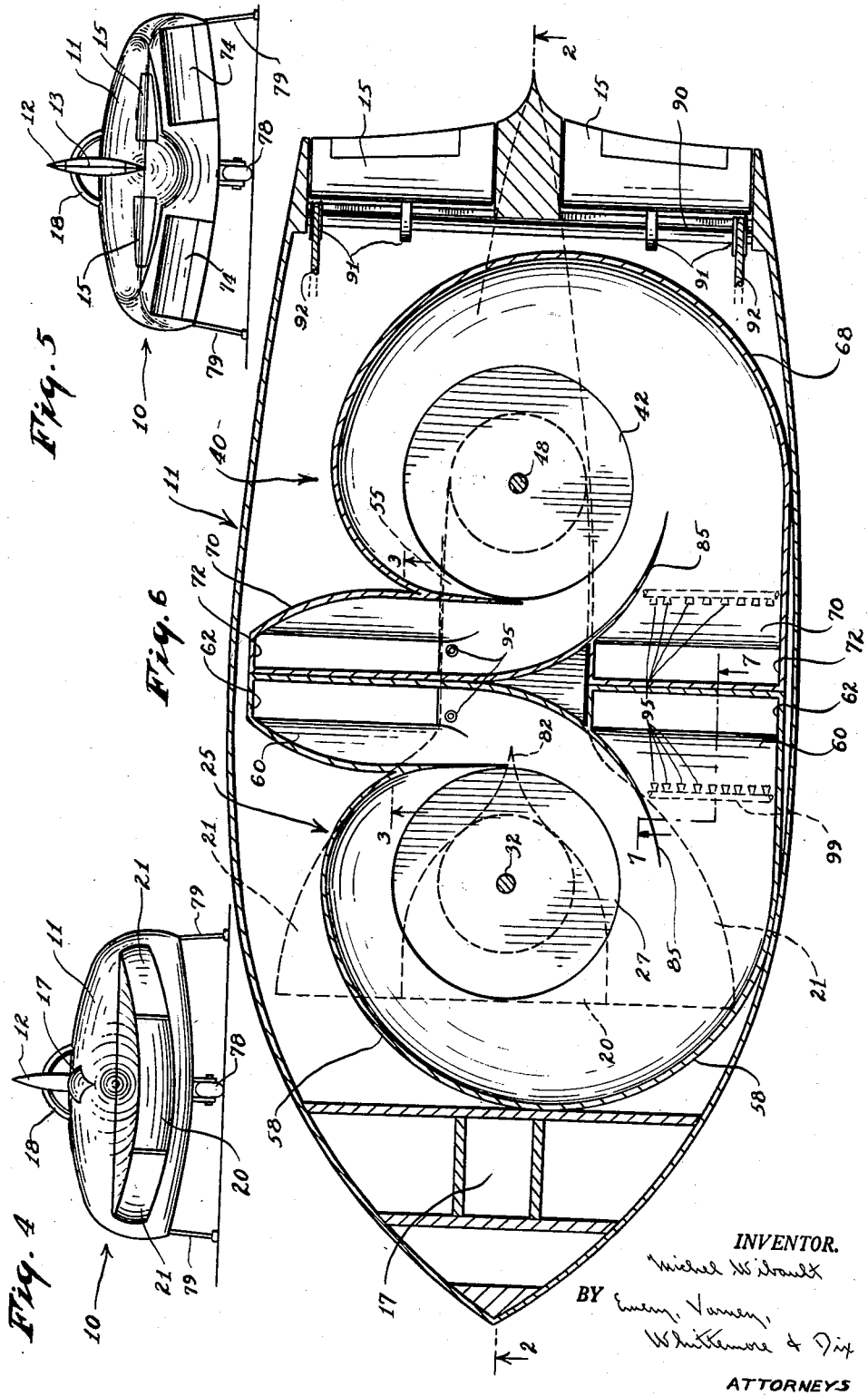

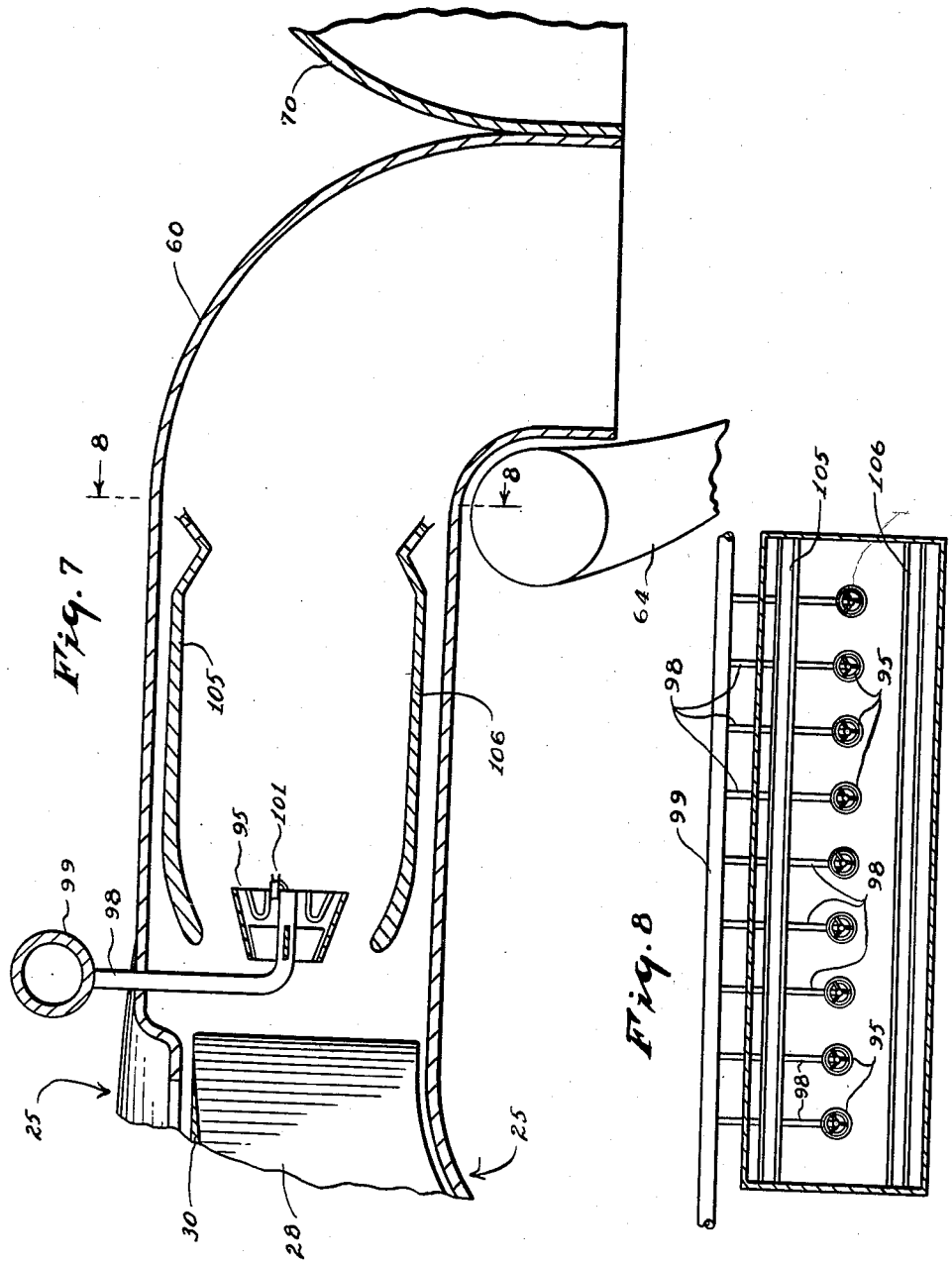

M. WIBAULT 2,930,546

JET AIRCRAFT CONVERTIBLE FOR VERTICAL
ASCENT AND HORIZONTAL FLIGHT

Filed May 19, 1954

INVENTOR.
Michel Wibault
BY Emery, Varney,
Whittemore & Dix.
ATTORNEYS

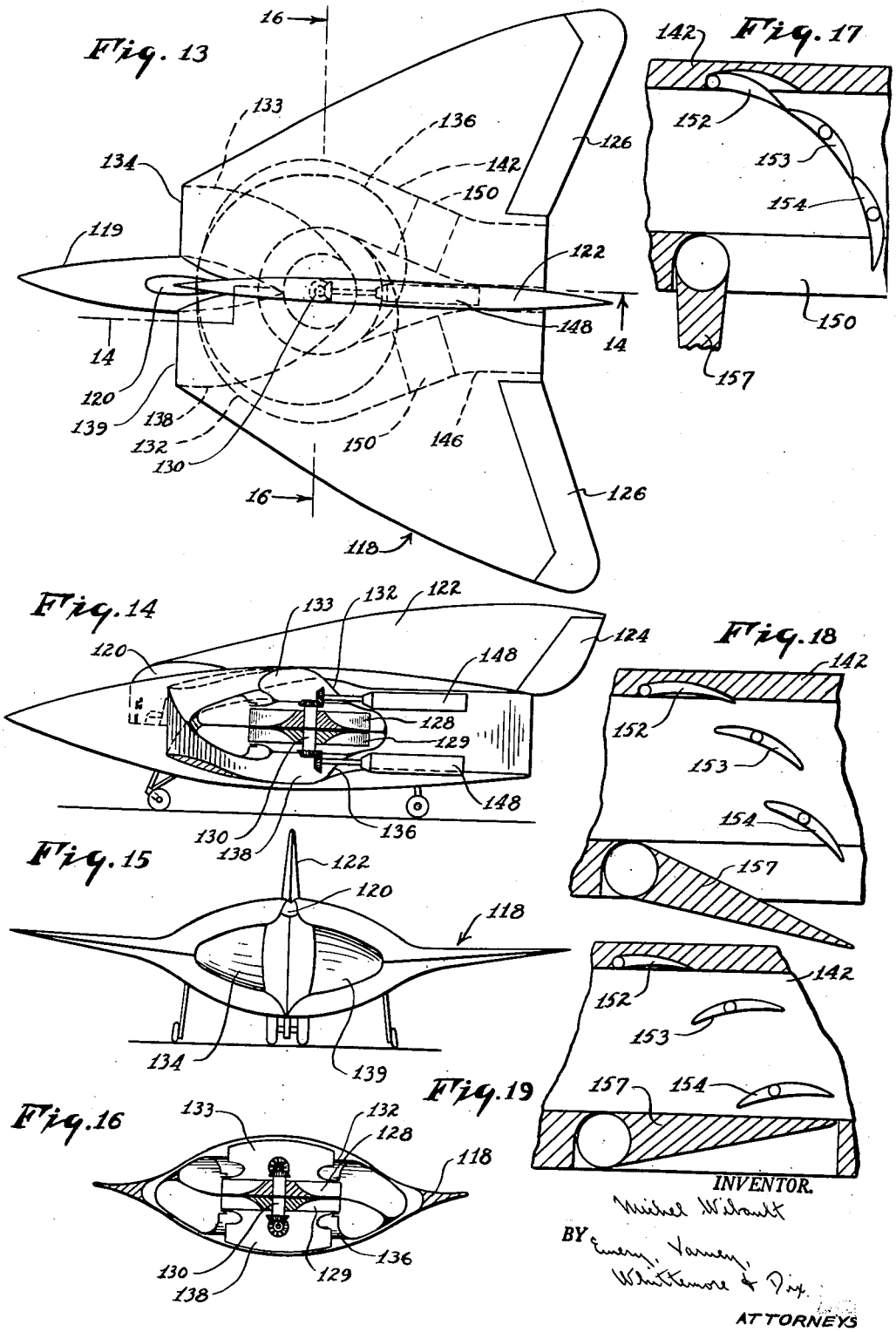

March 29, 1960

M. WIBAULT 2,930,546

JET AIRCRAFT CONVERTIBLE FOR VERTICAL
ASCENT AND HORIZONTAL FLIGHT

Filed May 19, 1954

INVENTOR.
Michel Wibault
BY Emery, Varney,
Whittemore & Dix
ATTORNEYS

United States Patent Office 2,930,546
Patented Mar. 29, 1960

2,930,546

JET AIRCRAFT CONVERTIBLE FOR VERTICAL ASCENT AND HORIZONTAL FLIGHT

Michel Wibault, New York, N.Y., assignor to Vibrane Corporation, New York, N.Y., a corporation of New York Application May 19, 1954, Serial No. 430,833

17 Claims. (Cl. 244—23)

This invention relates to heavier-than-air aircraft, and more especially to a type of aircraft in which the thrust reaction from airstreams or rotors, enclosed within the body of the aircraft, can be vertical for initial ascent or horizontal for forward flight, or in directions for any combination of vertical and horizontal flight components.

One object of the invention is to provide an improved aircraft, of the character indicated, with the same power plant and air thrust means for both horizontal and vertical flight. This reduces the weight and cost of the craft by eliminating additional power means that are otherwise necessary to obtain high speeds of horizontal flight.

One feature of the invention relates to aircraft having a plurality of enclosed rotors for developing thrust, and having discharge ducts which are located adjacent to one another so that the center of lift is not shifted to any great extent when the craft is flying with one rotor idle. For constructions where each rotor is driven by a separate power plant, this feature provides the safety of being able to fly and maintain stability in spite of failure of one of the power plants.

For obtaining additional thrust for short periods where higher speed or greater lift may be necessary, the invention provides heaters in the discharge streams of the rotors. The additional power obtained by expanding the air stream from the rotors is not a highly efficient use of the fuel, but it provides a means for obtaining peak power at very little additional weight.

Another feature of the invention relates to the shapes and correlations of the inlet and outlet ducts for the enclosed rotors, and the construction provides a particularly compact and light structure for the air thrust which is obtained.

In one embodiment of the invention there is a construction in which the spiral housing of a centrifugal blower is divided at one place in its circumferential extent for dividing the air stream for delivery to different discharge jets without waiting for the air to be delivered from the usual outlet passage of such a spiral housing.

Another object is to provide an aircraft, of the character indicated, in which approach and discharge ducts are correlated in such a way as to keep them short, with a minimum number of changes in the direction of flow, and a resulting high efficiency.

Other features relate to the combining of rotors in various ways to obtain air supplies from both above and below the craft, and to obtain straight discharge ducts on the same level as the scroll housings of the centrifugal compressors.

Other objects, features and advantages of the invention will appear or be pointed out as the description proceeds.

In the drawing, forming a part hereof, in which like reference characters indicate corresponding parts in all the views;

Figure 1 is a side elevation of an aircraft made in accordance with this invention;

Figure 2 is an enlarged, vertical sectional view taken on the center plane of the aircraft shown in Figure 1; and on the line 2—2 of Figure 6;

Figure 3 is a fragmentary view, similar to Figure 2, but taken on the plane 3—3 of Figure 6 through the discharge outlets of the blowers;

Figures 4 and 5 are reduced scale front and rear views, respectively, of the aircraft shown in Figure 1;

Figure 6 is a horizontal sectional view taken on the line 6—6 of Figure 2;

Figure 7 is a greatly enlarged fragmentary view through one of the discharge outlets, on the line 7—7 of Fig. 6, but with the rotor shifted to the left for clearer illustration, and this view illustrates the heating means for raising the temperature of the air stream;

Figure 8 is a reduced scale view taken on the line 8—8 of Figure 7;

Figure 13 is a top plan view, partly broken away and in section, showing a modified form of the invention in which twin rotors are used for taking air both from below and above the aircraft;

Figure 14 is a diagrammatic sectional view taken on the line 14—14 of Figure 13;

Figure 15 is a front view of the aircraft shown in Figures 13 and 14;

Figure 16 is a diagrammatic sectional view taken on the line 16—16 of Figure 15;

Figures 17, 18 and 19 are greatly enlarged, vertical sectional views through one of the discharge ducts of the craft shown in Figures 13–16;

Figure 9:
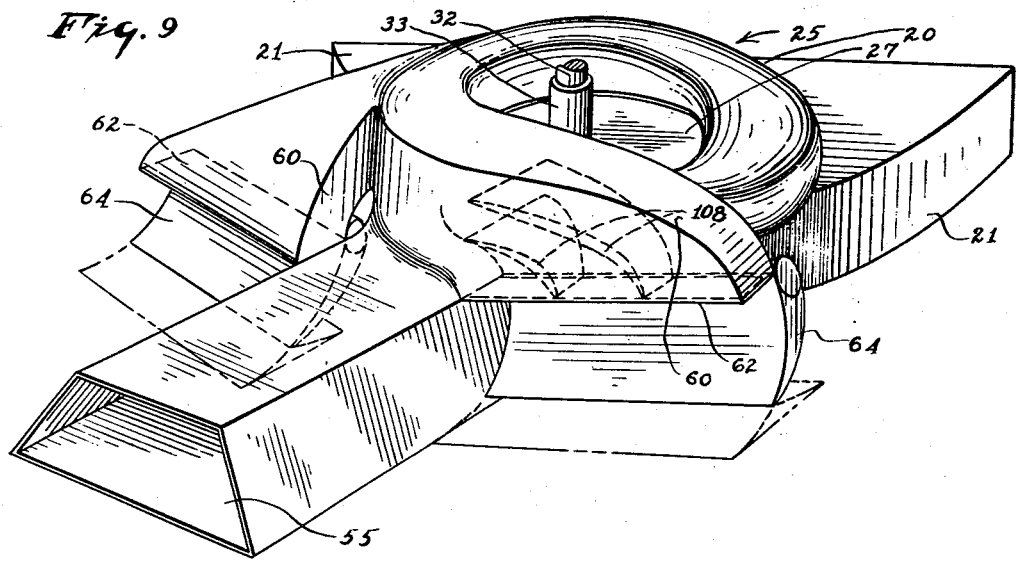
Figure 9 is a fragmentary perspective view of the front rotor with its discharge ducts, and this view also illustrates the location of the inlet duct for the rear rotor.

The aircraft 10 includes a body 11 with a fin 12 extending from its upper surface. There is a rudder 13 at the trailing end of the fin 12; and the craft has elevators 15, acting also as differential ailerons, at the trailing end of the body 11, on both sides of the rudder.

The craft is controlled from a cabin 17 near the front end of the body 11, and in the construction shown, turboprop engines are located in a compartment 18 on top of the body 11 where the front of the compartment is open to provide an air inlet for the engine. The exhaust from the engine is discharged rearwardly as indicated by the arrow 19.

Air is drawn into the body 11 through air ducts 20 and 21 (Figure 4), facing generally forward and at a low level of the craft, the entering air being indicated by the arrows 22 in Figure 1. The air is discharged from the body of the craft at a central location midway between the forward and rearward ends of the body 11 and under the center of gravity of the craft. For vertical ascent, the air is discharged downwardly; but for horizontal flight the jets are directed with a rearward component and the arrows 23, in Figure 1, show the discharge jets directed substantially horizontally for maximum forward speed. Although the aircraft obtains its lift as a direct reaction from the air jets when ascending vertically, it is not necessary to give the air jets any vertical component when flying at high speed. The body 11 provides sufficient wing surface to sustain the craft in high speed horizontal flight. At lower speeds, a combination of the sustaining effort of the lift surfaces and a vertical component of the discharge jets, produces the necessary lift for maintaining the desired elevation of the aircraft.

Figure 2 shows the center air duct 20 leading directly to the air inlet of a blower 25. Control surfaces for the aircraft can be located in the air stream passing to the air duct 20. A horizontal control vane 24 is shown ahead of the inlet 20. This vane is supported by a bracket extending down from the body 11 and it is swung into the dotted line positions illustrated by motion transmitting connections including a link 26 controlled by the pilot. Within the blower 25 there is a rotor comprising a hub 27 to which blades 28 are attached. This hub extends outwardly over the upper end of the blades and across the full diameter of the rotor.

The rotor hub 27 is connected to a drive shaft 32 which rotates in a bearing 33 carried by a rigid part of the aircraft body 11. The upper end of the drive shaft 32 is connected with reduction gearing 35, and this reduction gearing 35 is connected with a power plant 36, in the chamber 18, by a drive shaft 38.

The aircraft has a rear blower 40 which is of similar construction to the front blower 25. This blower 40 has a hub 42 with blades 44 and a drive shaft 48. As in the case of the blower 25 the rotor of the rear blower is connected with reduction gearing 50 which is driven from the power plant 36 through a drive shaft 52. If a radial engine is used, it may be located immediately above the blower and the blower may be connected directly to the engine in the same manner as the usual propeller.

The power plant 36 may be a single motor driving both of the rotors, but is preferably made with two separate motors, with one for each rotor, in order to provide a factor of safety in the event of an engine failure. The craft is preferably made to fly with one engine alone; and in any event, is capable of making a substantially vertical landing when operating with only one engine.

The rear blower 40 has an inlet duct 55 which extends along the center of the aircraft for a portion of its length, but which divides to receive air from air inlets on opposite sides of the duct 20, as will be explained more fully in connection with Figures 4 and 6.

The front blower 25 has a spiral housing 58 into which air is discharged by the blades 28 of the rotor. This housing 58 has a duct 60 directed downwardly. The outlet of the duct 60 is indicated by the reference character 62 (Figure 3).

There is a vane 64 extending downwardly from the outlet 62. The direction of the air jet discharged from the outlet 62 is controlled by swinging the vane 64 into different positions within the range indicated by the dotted line positions of this vane 64.

The rear blower 40 has a spiral housing 68 with a discharge duct 70 directed downwardly along a course immediately adjacent to the duct 60. The outlet of the discharge duct 70 is indicated by the reference character 72 and there is a vane 74 in position to direct the jet from the outlet 72 downwardly or to permit it to be directed rearwardly by the front vane 64, the jet from the outlet 62 deflected by the front vane 64, and by an auxiliary deflector 75 which is connected to the vane 74 for movement downward into the position shown in Figure 3 when the vane 74 is swung up into its horizontal position. When the vane 74 is in its downward (dotted line) position, the auxiliary deflector 75 is up in the passage 70, as shown in dotted lines.

By having the discharge ducts 60 and 70 located immediately adjacent to one another, and substantially under the center of gravity of the aircraft, the center of lift is affected very little if the only air jet is from the front duct 60 or from the rear duct 70.

Figure 3 shows the outlet ducts 60 and 70 which are on the far side of the rear blower inlet duct 55 in Figure 2. It will be understood that there are similar discharge ducts 60 and 70 on the near side of the inlet duct 55, as will be explained in connection with Figure 6.

Figure 4 is a front view of the aircraft. This view shows the center air duct through which air is supplied to the front blower, and it shows right and left-hand air ducts 21 through which air is supplied to the rear blower. The landing gear of the craft includes two center wheels 78 carried by retractable frames which are well understood in the art. The lateral stability of the craft is provided by the air streams as long as the blowers are running; and there are outriggers 79 which are put down to support the aircraft against lateral tilting when the craft is stationary and the blowers are to be stopped.

Figure 5 is a rearward view of the aircraft and this view shows the extent of the vanes 74 and the outlet passages from which the jets are discharged. In order to accommodate the structure more adequately to the fair form of the aircraft body 11, the discharge outlets and the deflecting vanes 74 are located along lines that slope upwardly toward the sides of the aircraft.

Figure 6 shows the construction of the blower housings 58 and 68, and illustrates also the relation of the air inlet ducts 20 and 21 with respect to one another, as well as the connection of the inlet ducts 21 with the duct 55 which supplies the rear blower 40.

The air ducts 21 converge behind the inlet to the front rotor and there is a baffle 82 for obtaining a streamlined contour where the air ducts 21 converge in to the supply duct 55 of the rear blower 40.

In order to obtain a more compact construction the discharge ducts 60 are connected with the blower housing 58 on opposite sides of a partition 85 which divides the interior of the housing 58 so that a portion of the air from the rotor passes directly to the first discharge duct 60 before the spiral housing 58 has extended around the entire circumference of the blower rotor. In effect, the partition 85 constitutes the beginning of a second spiral housing around the rotor of the blower 25 and a substantial portion of the air from the rotor discharges directly into this second spiral housing for delivery to the other discharge duct 60. By properly designing the spacing of the partition 85 from the rotor, and the angular extent of the partition 85, the total output from the blower 25 can be evenly distributed between the two discharge ducts 60.

The housing of the rear blower 40 is constructed in the same way as that of the front blower 25 with the necessary adjustments for the right and left-hand orientation of the two blowers. The partition 85 in the rear blower 40 produces an even distribution of the air between the two discharge ducts 70 of the rear blower 40.

Figure 6 shows also the elevators 15 which are connected to a span-wise shaft 90 by hinge plates 91. There is a motion-transmitting connection 92 between each of the elevators and control mechanism in the cabin of the aircraft.

Figures 7 and 8 show the heaters for supplying additional energy to the air jets from the front blower 25. Similar heaters are located in the discharge duct 70 (Figure 6) from the rear blower. These heaters include a plurality of burners 95 disposed at spaced locations across the full width of the duct 60 which receives air from the space outside of the partition 85; a similar heating system with burners 95, but with the burners disposed along a vertical line, is located in each of the other ducts 60 upstream from the outlets 62.

Referring again to Figures 7 and 8, the burners 95 are supported by pipes 98 extending downwardly from a common header 99 located above the duct 60. Fuel is supplied to the burners 95 from the header 99 through the pipes 98. This fuel may be gas but is preferably a liquid hydrocarbon fuel which is sprayed by the burners 95 and ignited by the spark plugs or other ignition devices 101, one of which is preferably located on each of the burners 95.

There are shields 105 and 106 located above and below the burners 95. These shields or plates 105 and 106 serve two purposes. They are shaped to control the flow of secondary air so as to provide an after flame beyond the downstream ends of the shields, with resulting increase in the efficiency of the heating system provided by the burners. The shields are also for protecting the walls of the duct 60 from overheating by the burner flames.

Part of the air stream, from the blades 28, passes between the walls of the duct and the shields 105 and 106. This air, which contains no fuel or flames, cools the outer faces of the shields 105 and 106, and reduces the heat radiation to the walls of the duct 60. The space enclosed between the shields 105 and 106 constitute the combustion chamber of the duct 60. Other means for heating the air can be used; and the burners 95 are merely representative of means for raising the temperature of the air stream to impart additional energy to the jets that are discharged from the ducts 60 and 70.

Figure 9 shows the front blower 25 in perspective; and this figure also shows deflector plates 108 located in the discharge duct 60 for the purpose of distributing the air more uniformly across the full width of the discharge duct.

Figure 10:
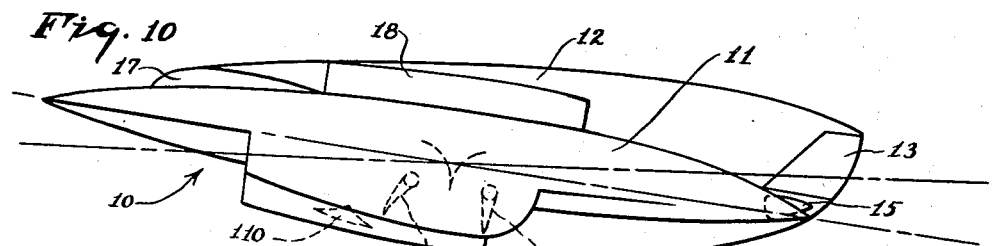
Figures 10, 11 and 12 are diagrammatic views showing the positions of the parts when the aircraft is rising vertically, cruising at moderate speed and traveling at maximum horizontal speed, respectively.
Figure 11:
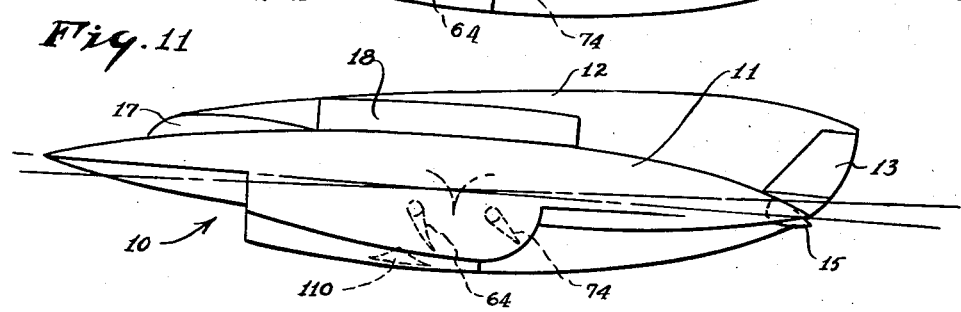
Figure 12:
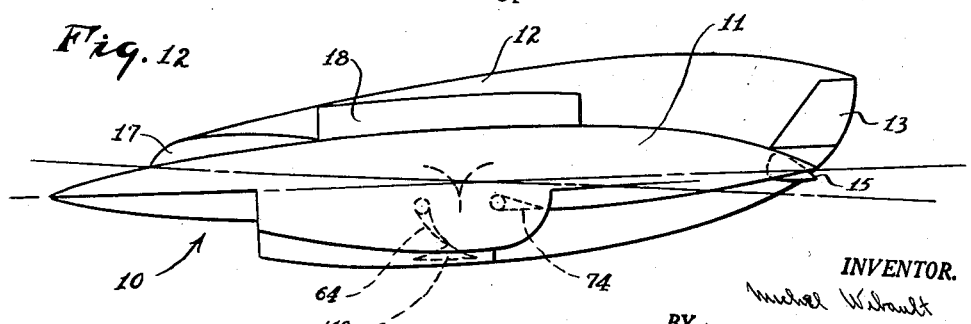

Figures 10, 11, and 12 shows the positions of the vanes 64 and 74 for different conditions of flight. In order to obtain an extension of the deflecting surface of the front vanes 64, when directing the air stream rearwardly, there are deflectors 110 associated with the air discharge ducts on both sides of the aircraft. These deflectors slide forward and aft, and one of them is shown in its forward position in Figure 10. In this position it exerts no influence on the direction of the air jets. The deflectors are moved forward and aft by control links 112 (Figure 3) under the control of the pilot.

As the forward vanes 64 swings rearwardly into the positions shown in Figures 11 and 12, the deflectors 110 slide rearwardly into position to co-operate with the vanes 64 to deflect the air stream into a direction having progressively greater rearward components. The deflectors 110 slide on bearings on the fixed structure of the aircraft body 11 and they are operated from the same controls which swing the front vanes 64.

Figures 13–16 show a modified form of the invention in which the craft has a delta wing 118 with a nose 119 and a cabin 120 at its forward end; and a fin 122 extending upward from the wing along its chordwise center line. There is a rudder 124 hinged to the rearward end of the fin, and there are other control surfaces 126 hinged to the trailing edges of the rigid portions of the wing.

The wing increases substantially in thickness toward its chordwise center line to enclose a chamber which houses two rotors 128 and 129 on a common shaft 130. These rotors are preferably of similar construction to that shown in previous figures of the drawing, but the upper rotor 128 is turned upward so that it draws air down from above the wing, while the lower rotor 129 draws air up from below the wing. The rotors 128 and 129 are preferably rotated in opposite directions on the shaft 130 so as to reduce the secondary gyroscopic effects.

The upper rotor 128 has a housing or scroll 132 to which air is supplied through a duct 133 having an inlet 134 at the leading edge of the wing on the left side of the cabin 120. The lower rotor 129 has its housing or scroll 136 supplied with air from beneath the rotor through a duct 138 which has its inlet 139 at the leading edge of the wing on the right hand side of the cabin 120.

The scrolls 132 and 136 have discharge ducts 142 and 146, respectively directed rearwardly, side by side and immediately adjacent to one another on opposite sides of the chordwise center line of the craft. These discharge ducts 142 and 146 are at the same level as the scrools and have no more curvature than is necessary to bring them parallel to one another and in line with the direction of flight of the craft.

The rotors 128 and 129 are driven by engines 148 located between the forward ends of the discharge ducts 142 and 146 at levels which permit convenient driving connections to the rotors.

In order to obtain vertical thrust, each of the discharge ducts 142 and 146 has an outlet 150 across its bottom wall. There are vanes 152, 153 and 154 (Figure 17) in each discharge duct for diverting the air stream downward through the outlet 150 when all of the power in the airstream is to be used for vertical lift; for example, during vertical ascent or hovering of the craft.

When the craft is cruising at moderate speed, part of the air stream from the rotors of the compressors is used for lift and part is used to develop horizontal thrust for driving the aircraft forward. This condition is brought about by shifting the vanes 152, 153 and 154 into positions that leave spaces between the vanes for passage of some of the air rearwardly along the duct 142; and the outlet 150 is partially closed by a gate 157. In its partially closed position, the gate 157 deflects the air stream from the outlet 150 rearwardly and further adds to the forward thrust.

Figure 19 shows the position of the parts when all of the air in the duct 142 is being used to develop horizontal thrust for maximum speed. Under this condition the surfaces of the wing are sufficient to develop the necessary lift. The outlet 150 is completely closed by the gate 157; and the vane 152 is swung into a recess and out of the air stream, and the other vanes 153 and 154 are swung into position where their streamlined forms offer a minimum of resistance to the air stream in the duct.

The double entry air supply shown in Figs. 13 and 14 has the advantage of reducing the required diameter of the rotor for any given air flow and reducing the projected wing area of the craft, with resulting reduction in both weight and cost. This double entry feature, whereby air is supplied simultaneously from both above and below the rotor, can be used with one rotor or two or more rotors.

It will be understood that any of the modifications described herein can be made with the double entry air supply. Any of the compressors can be modified to obtain two or more stages of compression by having rotors in series.

Figure 20:
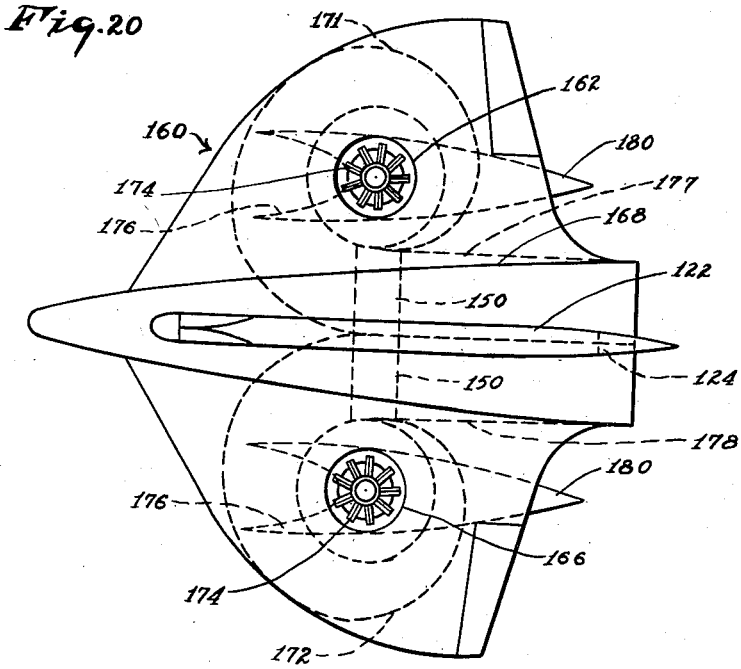
Figure 20 is a top plan view, partly broken away and in section, showing another modified form of the invention for reducing the number of changes of direction of the air.
Figure 21:
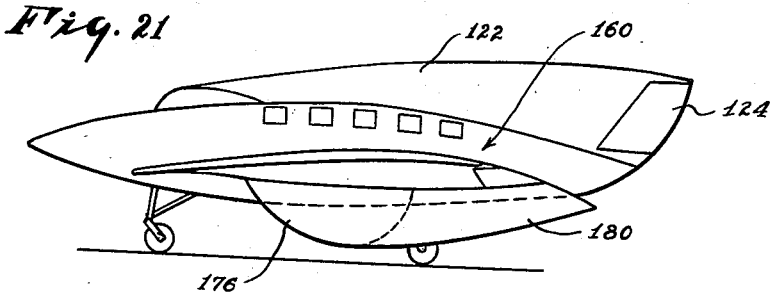
Figure 21 is a diagrammatic side elevation of the aircraft shown in Figure 20.
Figure 22:
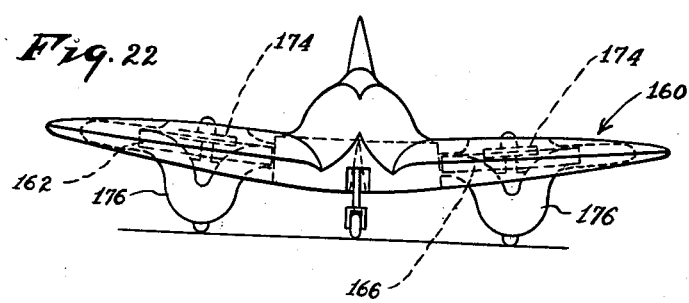
Figure 22 is a front view of the aircraft shown in Figures 20 and 21.

Figure 20 shows another modification of the invention in which a swept-back wing 160 is made thick enough to house rotors 162 and 166 within the wing on opposite sides of a fuselage 168 which includes a cabin. The rotors 162 and 166 are similar to those of the other centrifugal compressors already described and they discharge air into housings or scrolls 171 and 172 within the wing 160. Each of the rotors 162 and 166 is directly connected to a radial engine 174, in the construction illustrated; but these rotors can be driven in other ways through motion transmitting connections and reduction gearings, if desired.

There is a scoop 176 extending down from the wing 160 under each of the rotors 162 and 166 to supply air to the center inlet openings of the scrolls 171 and 172, respectively. The scroll 171 is a left-hand scroll, and the scroll 172 is right hand, so that discharge ducts 177 and 178, from the scrolls 162 and 166, respectively, extend rearwardly immediately adjacent to one another on opposite sides of the fore-and-aft center line of the aircraft.

Behind the inlet scoops 176, there are streamlined housings 180 for preventing burble of the air that flows past the sides of the scoops 176.

For developing lift for vertical ascent or hovering, or for converting some part of the force of the air streams from the rotors 162 and 166 into direct lift, there are outlets 150 in the bottom walls of the air discharge ducts 177 and 178. The outlets have gates for closing them, and there are vanes in the ducts 177 and 178 for deflecting the air streams downward, as shown in Figures 17–19.

The preferred embodiment of the invention has been illustrated and described, but changes and modifications can be made and some features of the invention can be used in different combinations without departing from the invention as defined in the claims.

What is claimed is:

1. An aircraft including a body, an air compressor located within the body and having a discharge duct directed downwardly to develop a lift reaction, and a second air compressor located within the body and having a discharge duct directed downwardly for developing a lift reaction, both of the ducts having their outlets located adjacent to one another and the center of area of the outlets of all of said ducts being substantially under the fore-and-aft center line of the aircraft so that the center of lift of the reaction is affected very little whether one or both compressors are in operation.

2. The aircraft described in claim 1 and in which the outlets from both of the compressors extend along lines which pass substantially under the center of gravity of the aircraft, and in which the outlet from each compressor is elongated in a direction that extends transversely of the craft and is substantially symmetrical about a fore-and-aft plane extending through the center of gravity of the craft.

3. An aircraft including a body, a centrifugal compressor located within the body and having a rotor that turns about a generally vertical axis and that has blades, an axially disposed inlet through which air is supplied to the rotor, a spiral housing which extends around the full periphery of the rotor and which encloses a chamber into which air is discharged by the rotor, the chamber having a downwardly directed outlet in the bottom of the housing at a region short of the outer end of the spiral and a second outlet in the housing directed downwardly near the outer end of the spiral, and deflecting means located below each of the outlets and adjustable to change the direction in which the air streams flow after discharge from said outlets.

4. The aircraft described in claim 3, and in which there is a second centrifugal compressor within the body, of similar construction to the first centrifugal compressor, but with its spiral housing turned in the opposite direction so that the discharge outlets from the spiral housing of the second compressor are adjacent to the discharge outlets from the first compressor.

5. The aircraft described in claim 3, and in which there is a spiral partition within the housing extending for a portion of the circumference of the housing and dividing the chamber within the housing into different portions for the flow of air to the separate outlets, and in which the outlets from the housing are spaced from one another with a substantial clearance between them, one and each of the outlets has its own deflecting means for determining the direction of the air flow after it leaves the outlet from the compressor housing.

6. The aircraft described in claim 3, and in which the outlets from the spiral housing are elongated openings and have their long dimensions extending spanwise across the aircraft body, and at least the second outlet having deflectors of fair form therein at spaced regions along the length of the outlet and shaped to deflect the air flow in the chamber downwardly through the outlet opening.

7. An aircraft including a body having a compressor therein, the compressor comprising a centrifugal blower with a rotor, a scroll housing and an air inlet disposed generally axially with respect to the rotor, an air supply duct leading to the air inlet and disposed below the housing and curving upwardly into communication with the air inlet of the blower housing, and air discharge duct means leading from a discharge outlet of the housing and located behind the air inlet duct and having means adjustable into different positions for deflecting the air from the compressor downwardly for lift reaction against the deflecting means when ascending and adjustable means for deflecting the downwardly moving air rearwardly for forward thrust when the craft is to fly with a horizontal component of motion.

8. An aircraft including a compressor having a discharge duct which has its downstream end directed downwardly and which is elongated in a direction extending spanwise across at least a portion of the width of the aircraft, and a deflector located below the discharge outlet of the duct and adjacent to the air stream from the outlet, the deflector being adjustable into different positions to deflect the air stream rearwardly at different angles to the horizontal for developing a reaction thrust which has a desired combination of vertical and horizontal components of force, a vane located below the deflector with a rearward surface of the vane which cooperates with the deflector, when the deflector is in its most rearward position, to provide a substantially continuous deflecting surface which turns the air stream from the compressor to a substantially horizontal and rearward direction of flow, and means for reciprocating the deflector forward and aft to move it out of operative position when the air stream is to be directed downwardly, or rearwardly with only small horizontal components.

9. An aircraft including a compressor, a discharge duct leading from the compressor and having its outlet end directed downwardly, a second compressor having a discharge duct with its outlet end directed downwardly at a location adjacent to and rearward of the outlet from the first compressor so that the air streams from both compressors combine to produce a single air stream for developing a reaction lift for sustaining the aircraft, a deflector extending transversely of the aircraft and at a location immediately ahead of the outlet from the first compressor, another deflector extending transversely of the aircraft and located immediately behind the outlet from the second compressor, pivot bearings on which, both of said deflectors are movable angularly about axes extending substantially parallel to one another and transversely of the aircraft, said deflectors being movable between substantially vertical positions and positions at an angle to the vertical and in which their confronting surfaces define a duct with the direction of the duct, and the resulting direction of flow of the air stream beyond the lower ends of the deflectors, vertical or with various horizontal components of direction, depending upon the extent to which the deflectors are swung angularly about their axes.

10. An aircraft including two compressors, one of which is located behind the other in the direction of the length of the aircraft, an inlet duct leading to the forward compressor, another inlet duct leading to the rearward compressor, the inlet duct for the rearward compressor having branch passages which extend on both sides of the inlet duct for the forward compressor so that the forward compressor has a central air inlet and the rearward compressor has two air inlets for its supply duct with one inlet located on each side of the inlet for the forward compressor, an air discharge duct from the forward compressor having its outlet directed downwardly and with said outlet elongated in a direction transverse of the aircraft, a discharge duct from the rearward compressor with its outlet directed downwardly at a location immediately adacent to the outlet of the forward compressor and elongated in a direction transverse of the aircraft, and deflectors located ahead of and behind the discharge duct outlets from the compressors, the deflectors being adjustable to change the direction of discharge of the air from a vertical direction to one having various selected horizontal components.

11. The aircraft described in claim 10 and in which the air supply ducts for both of the compressors are located below the level of the compressors and have rearward ends that direct air upwardly into the compressors, and in which the discharge ducts from both of the compressors are divided with a portion of each discharge duct located on one side of the inlet duct for the rearward compressor and another portion of each discharge duct located on the other side of the inlet duct for the rearward compressor.

12. An aircraft including a body, a centrifugal compressor within the body and having a rotor rotatable about an axis extending transversely of the fore-and-aft center line of the aircraft, the compressor having a scroll housing with a discharge outlet at a region of the circumference of the scroll, the aircraft body having a bottom surface under its forward portion which comprises a lifting surface for the aircraft, duct means for supplying air to the compressor, the duct means extending downwardly below the level of the forward sustaining surface and having a forwardly opening entrance into which air flows after moving across said sustaining surface, the duct means curving beyond the entrance and into alignment with the inlet of the centrifugal compressor, another sustaining surface located below the duct means and extending rearwardly from the lower end of the forwardly opening entrance, and discharge duct means including the scroll outlet, the discharge duct means having its downstream end located behind the inlet duct means and with deflectors for deflecting the stream of discharged air in a substantially horizontal direction when the aircraft is moving forwardly at high speed, the direction of rearward discharge of the air stream being substantially in line with the direction in which air enters the inlet duct means, and the aircraft body having rearward sustaining surfaces located above the air stream which is discharged from the discharge duct means.

13. An aircraft including a body, two compressors located within the body, the body having a bottom surface at its forward end which comprises a sustaining surface of the aircraft when in flight, an air inlet duct for one of the compressors extending below the forward sustaining surface of the aircraft and opening forwardly so as to receive at least a portion of the air which flows rearwardly over the forward sustaining surface, branch ducts for supplying air to the second compressor, the branch ducts extending downwardly below the forward sustaining surface and on both sides of the duct for the first compressor and with forwardly directed openings for receiving some of the air which passes rearwardly across the forward sustaining surface, an inlet duct for the second compressor located immediately behind the inlet duct for the first compressor and into which both of the branch ducts open, sustaining surfaces under the duct for the first compressor, the branch ducts and the duct for the second compressor, discharge ducts from the first compressor directed downwardly on opposite sides of the air inlet duct for the second compressor, similar discharge ducts for the second compressor directed downwardly on opposite sides of the inlet duct for that compressor, the outlets for the discharged ducts being at a higher level than the sustaining surfaces below the ducts, and deflectors ahead of the outlets from the discharge ducts and extending downwardly therefrom to a level near that of the sustaining surfaces which are below the ducts, the deflectors being movable into different angular positions about axes extending transversely of the craft for directing the air streams from the outlets of the discharge ducts rearwardly with various components of horizontal direction depending upon the relative horizontal and vertical components of thrusts desired for the intended conditions of flight.

14. An aircraft including a centrifugal compressor for discharging a stream of air for developing a thrust for moving the aircraft, the centrifugal compressor having a spiral housing into which the air is compressed, discharge means with which the spiral housing merges and through which the compressed air is delivered in a downward direction, the discharge means having an outlet end portion which is elongated in a direction spanwise of the aircraft, the spanwise dimension of the outlet end portion being many times the dimension of the outlet end portion in a fore-and-aft direction to increase the extent of the outlet end portions from the roll axis of the aircraft for any given cross-section of the outlet end portion, and the outlet end portion of the discharge means having one spanwise extending wall that deflects the direction of air stream flow from the compressor downwardly to develop an upward thrust against said wall, and deflecting means at the down stream end of the air discharge means, the deflector means being adjustable into different angular positions about an axis extending spanwise of the aircraft for imparting rearward components of direction to the air stream to develop various degrees of forward thrust when the aircraft is in flight.

15. The aircraft described in claim 14 and in which the discharge means is located in position to direct the air stream downwardly along a line that extends transversely of the aircraft substantially under the center of gravity of the aircraft to reduce the pitching movements of the aircraft when ascending vertically under the thrust of the air stream from the discharge means.

16. An aircraft including a compressor, discharge means through which the compressor delivers air downwardly for developing an upward thrust independent of any horizontal movement of the aircraft, an air duct through which air is supplied to the compressor, said air duct having a forwardly directed inlet into which air flows with a ram action when the aircraft is in horizontal flight, and a control surface located in the open air spaced from and immediately ahead of the inlet duct but in the air stream flowing to the duct and to the compressor, said control surface being movable into different positions to change the orientation of the aircraft with respect to a horizontal plane through the center of gravity of the aircraft.

17. An aircraft including a body, a plurality of compressors enclosed within the body, each of the compressors comprising a centrifugal blower with a housing having a central inlet and a peripheral outlet, inlet ducts below the compressors and opening toward the front of the craft and curving upwardly into communication with the air inlets of the compressors, the airstreams from the compressors being sufficient to lift the aircraft substantially vertically when said air streams are directed downwardly, power means for driving the compressors, discharge ducts rearward of the inlet ducts leading from the compressor outlets and air deflectors associated with the discharge ducts and at least some of which are movable into different positions to change the directions of the air streams from the compressors between vertical or horizontal and different combinations of the two, for different conditions of flight.

References Cited in the file of this patent

UNITED STATES PATENTS

| | | |
|---|---|---|
| 1,389,797 | Thompson | Sept. 6, 1921 |
| 1,585,281 | Craddock | May 18, 1926 |
| 1,741,578 | Lyons | Dec. 31, 1929 |
| 2,077,471 | Fink | Apr. 20, 1937 |
| 2,364,677 | Ularner | Dec. 12, 1944 |
| 2,377,835 | Weygers | June 5, 1945 |
| 2,384,893 | Crook | Sept. 18, 1945 |
| 2,461,435 | Neumann | Feb. 8, 1949 |
| 2,502,045 | Johnson | Mar. 28, 1950 |

FOREIGN PATENTS

| | | |
|---|---|---|
| 377,237 | Great Britain | July 22, 1932 |
| 694,497 | France | Sept. 16, 1930 |
| 801,230 | France | May 16, 1936 |

OTHER REFERENCES

Jane's All The World's Aircraft, 1951-1952, page 271c,